(12) United States Patent
Kubota et al.

(10) Patent No.: US 7,008,718 B2
(45) Date of Patent: Mar. 7, 2006

(54) FUEL CELL ASSEMBLY

(75) Inventors: Tadahiro Kubota, Saitama (JP); Jun Sasahara, Saitama (JP); Nariaki Kuriyama, Saitama (JP); Yuji Isogai, Saitama (JP); Sang-Joon John Lee, Stanford, CA (US)

(73) Assignees: Honda Giken Kogyo Kabushiki Kaisha, Tokyo (JP); The Board of Trustees of the Lealand Stanford Junior University, Palo Alto, Ca.

(*) Notice: Subject to any disclaimer, the term of this patent is extended or adjusted under 35 U.S.C. 154(b) by 328 days.

(21) Appl. No.: 10/275,592

(22) PCT Filed: May 8, 2001

(86) PCT No.: PCT/US01/11762

§ 371 (c)(1),
(2), (4) Date: Apr. 1, 2003

(87) PCT Pub. No.: WO01/95405

PCT Pub. Date: Dec. 13, 2001

(65) Prior Publication Data

US 2003/0162076 A1 Aug. 28, 2003

Related U.S. Application Data

(60) Provisional application No. 60/242,136, filed on Oct. 23, 2000, provisional application No. 60/202,827, filed on May 8, 2000.

(51) Int. Cl.
*H01M 2/14* (2006.01)
*H01M 4/86* (2006.01)

(52) U.S. Cl. .......................... 429/39; 429/44

(58) Field of Classification Search .......... 429/38, 429/44, 34, 39, 40
See application file for complete search history.

(56) References Cited

U.S. PATENT DOCUMENTS

| 4,551,220 A | * | 11/1985 | Oda et al. ................ 204/294 |
| 4,857,420 A | * | 8/1989 | Maricle et al. .............. 429/30 |
| 6,841,290 B1 | * | 1/2005 | Klitsner et al. .............. 429/44 |

FOREIGN PATENT DOCUMENTS

| DE | 19757320 | * | 7/1999 |
| JP | 04306563 | * | 10/1992 |
| WO | 0069007 | * | 11/1995 |

* cited by examiner

*Primary Examiner*—Patrick Joseph Ryan
*Assistant Examiner*—Thomas H. Parsons
(74) *Attorney, Agent, or Firm*—Lumen Intellectual Property Services, Inc.

(57) ABSTRACT

A fuel cell assembly is provided that includes a plurality of cells. Each cell includes an electrolyte layer (2), a pair of gas diffusion electrode layers (3, 4) interposing the electrolyte layer between them, and a pair of flow distribution plates (5) for defining passages (10, 11) for fuel and oxidizer gases that contact the gas diffusion electrode layers. The electrolyte layer (2) includes a frame (21) with a grid (21a), which has a number of through holes (21b), and electrolyte (22) retained in each of the through holes. Because the electrolyte is not required to be interposed between structural members such as the gas diffusion electrode layers and flow distribution plates, the electrolyte is allowed to expand into the passages for the fuel and oxidizer gases so that no undesirable stresses are produced, and the structural members would not be affected by the expansion of the electrolyte.

11 Claims, 4 Drawing Sheets

FUEL CELL ASSEMBLY

This application claims the benefit of U.S. Provisional Application Nos. 60/202,827, filed May 8, 2000, and 60/242,136, filed Oct. 23, 2000, both of which are herein incorporated by reference.

TECHNICAL FIELD

The present invention relates to a fuel cell assembly typically has a plurality of fuel cells each including an electrolyte layer, a pair of gas diffusion electrode layers placed on either side of the electrolyte layer, and a pair of flow distribution plates placed on either outer side of the gas diffusion electrode layers to define passages for distributing fuel gas and oxidizing gas in cooperation with the opposing surfaces of the gas diffusion electrode layers.

BACKGROUND OF THE INVENTION

A fuel cell includes an electrolyte layer and a pair of electrodes placed on either side of the electrolyte layer, and generates electricity through an electrochemical reaction between fuel gas such as hydrogen and alcohol and oxidizing gas such as oxygen and air, which are supplied to the corresponding electrodes, with the aid of a catalyst. Depending on the electrolytic material used for the electrolyte layer, the fuel cell may be called as the phosphoric acid type, solid polymer type or molten carbonate type.

In particular, the solid polymer electrolyte (SPE) type fuel cell using an ion-exchange resin membrane for the electrolyte layer is considered to be highly promising because of the possibility of compact design, low operating temperature (100° C. or lower), and high efficiency.

The SPE typically includes an ion-exchange resin membrane made of perfluorocarbonsulfonic acid (Nafion: tradename), phenolsulfonic acid, polyethylenesulfonic acid, polytrifluorosulfonic acid, and so on. A porous carbon sheet impregnated with a catalyst such as platinum powder is placed on each side of the ion-exchange resin membrane to serve as a gas diffusion electrode layer. This assembly is referred to as a membrane-electrode assembly (MEA). A fuel cell can be formed by defining a fuel gas passage on one side of the MEA and an oxidizing gas passage on the other side of the MEA by using flow distribution plates (separators).

Typically, such fuel cells are stacked, and the flow distribution plates are shared by the adjacent fuel cells in the same stack. When forming such a stack, it is necessary to seal off the passages defined on the surfaces of the MEAs from outside. Conventionally, gaskets were placed in the periphery of the interface between each adjoining pair of a MEA and a distribution plate. The contact area between the MEA and the gas diffusion electrode was ensured by pressing them together by applying an external force, typically with the aid of a suitable fastener. The required electric connection between the gas diffusion electrode and an electrode terminal connected to an external circuit was also ensured by pressing them together by applying an external force.

However, the SPE can function as an ion-exchange membrane only when impregnated with water, and the SPE when impregnated with water significantly changes its volume depending on the temperature. The resulting stress affects the pressure that is applied to the fuel cell, and this prevents an accurate control of the pressure acting between the different layers of the fuel cell. If the pressure is not proper, the seal may break, and the electric contact between the electrode terminal and the gas diffusion electrode may fail. Occurrence of any of such event means a total failure of the fuel cell assembly.

BRIEF SUMMARY OF THE INVENTION

In view of such problems of the prior art, a primary object of the present invention is to provide a fuel cell assembly which can ensure a favorable seal under all conditions.

A second object of the present invention is to provide a fuel cell assembly which can ensure a reliable electric contact between the electrode terminal and the gas diffusion electrode.

A third object of the present invention is to provide a fuel cell assembly which is highly compact and efficient at the same time.

A fourth object of the present invention is to provide a fuel cell assembly which is easy to manufacture.

According to the present invention, such objects can be accomplished by providing a fuel cell assembly that includes at least one cell including an electrolyte layer, a pair of gas diffusion electrode layers interposing the electrolyte layer between them, and a pair of flow distribution plates for defining passages for fuel and oxidizer gases that contact the gas diffusion electrode layers so that the electrolyte layer includes a frame with a grid that has a number of through holes, and electrolyte retained in each of the through holes.

Because the electrolyte itself is not held between the two gas diffusion electrode layers or the flow distribution plates, an expansion of the electrolyte can be readily accommodated by the electrolyte bulging into the passages, and none of the structural members of the fuel cell assembly is subjected to any undue stress. In other words, the grid frame supports the pressure that may be applied thereto by the gas diffusion electrode layers or the flow distribution plates.

Preferably, the gas diffusion electrode layers are formed by performing an etching process on a substrate. The frame grid may also be formed by performing an etching process on a substrate. This eliminates a need for precision machining or other special working processes for efficient manufacturing of compact fuel cell assemblies, and allows them to be manufactured by using conventionally available techniques such as etching which has developed primarily in the field of semiconductor devices. This provides a significant advantage in economy.

In particular, if the grid of the frame is provided with a projection which projects into the corresponding through hole, the electrolyte can be securely retained in the through holes defined by the grid. Such a projection can be conveniently formed in the grid if the frame is made of silicon substrate or metals or some other etchable material, and the through holes and projections are formed by conducting anisotropic etching from two sides of the silicon substrate so as to produce a narrowed middle part in each through hole.

According to a preferred embodiment of the present invention, each of the flow distribution plates includes a central recess and a number of projections formed in the recess, and each projection of the flow distribution plates engages the corresponding gas diffusion electrode layer so as to interpose the gas diffusion electrode layer between the projection and the grid. Typically, the projections are provided with an electrode terminal layer for electrically connecting the gas diffusion electrode layers with an external circuit. Therefore, the projections individually contact the opposing gas diffusion electrode layer, and establish numerous parallel paths for electric conduction between the gas diffusion electrode layer and the electrode terminal layer so that a highly reliable electric contact can be established between them.

According to a preferred embodiment of the present invention, each flow distribution plate is made of silicon substrate, and the central recess and projections are formed by wet etching (ex. anisotropic). According to this arrangement, a highly stable structure in terms of mechanical strength can be achieved while allowing narrow distribution passages to be defined in an accurate manner without any difficulty.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
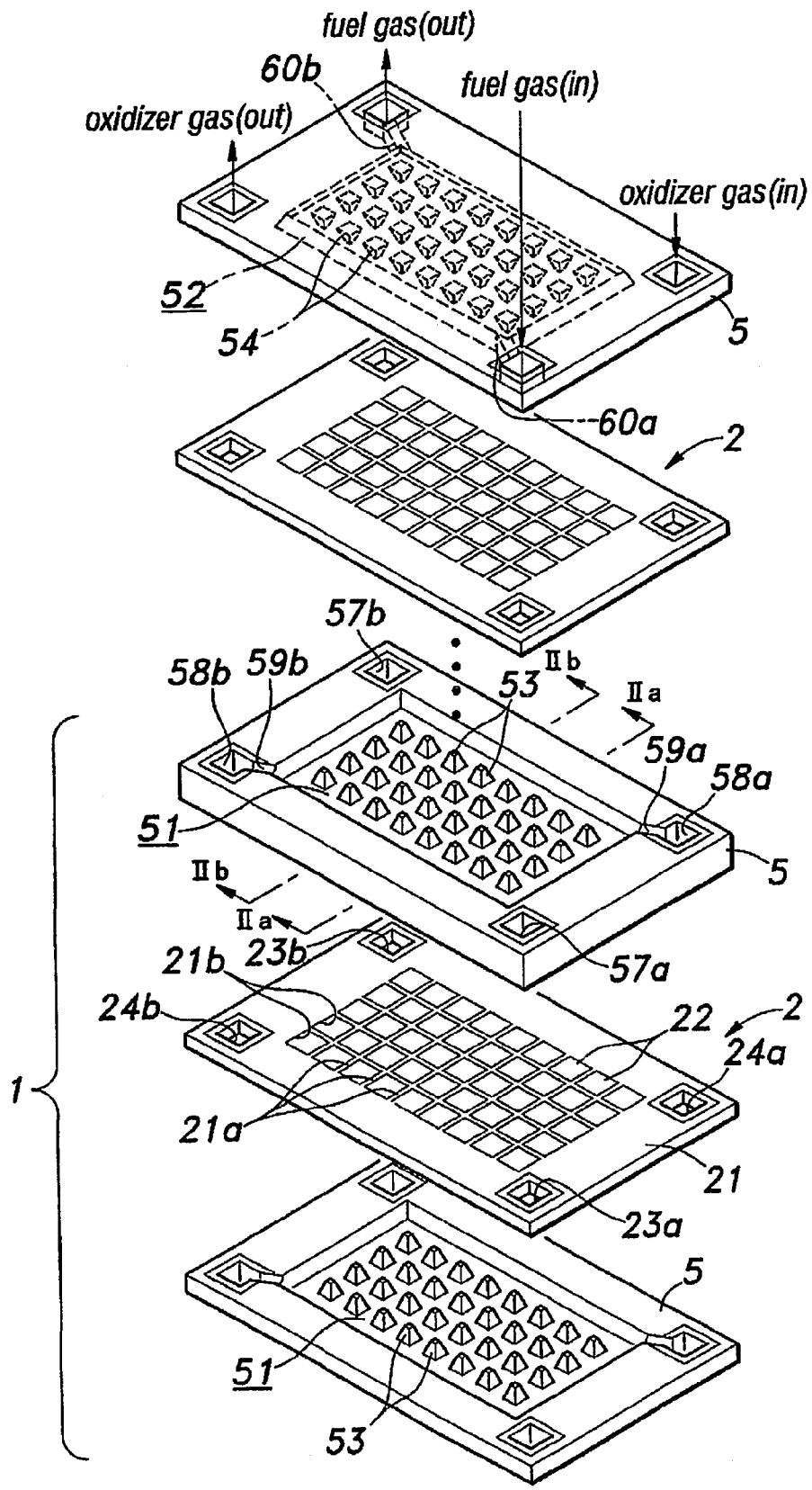
FIG. 1 is an exploded perspective view of a part of a fuel cell assembly embodying the present invention.

FIG. 1 shows the structure of a part of a fuel cell assembly embodying the present invention. In practice a plurality of cells are formed into a stack, and a number of such stacks are connected in series and/or parallel, and fuel such as reformed alcohol, hydrogen gas or the like is supplied to each fuel cell stack along with oxidizing gas such as air.

Figure 2A:
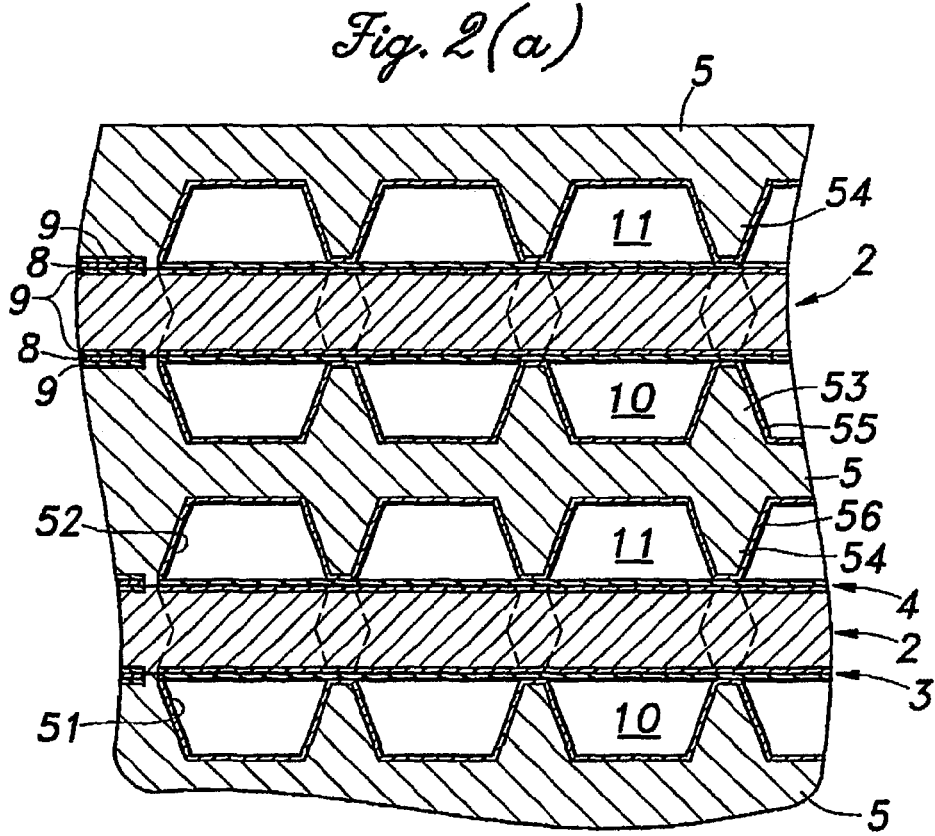
FIG. 2a is a sectional view taken along line IIa—IIa of FIG. 1.
Figure 2B:
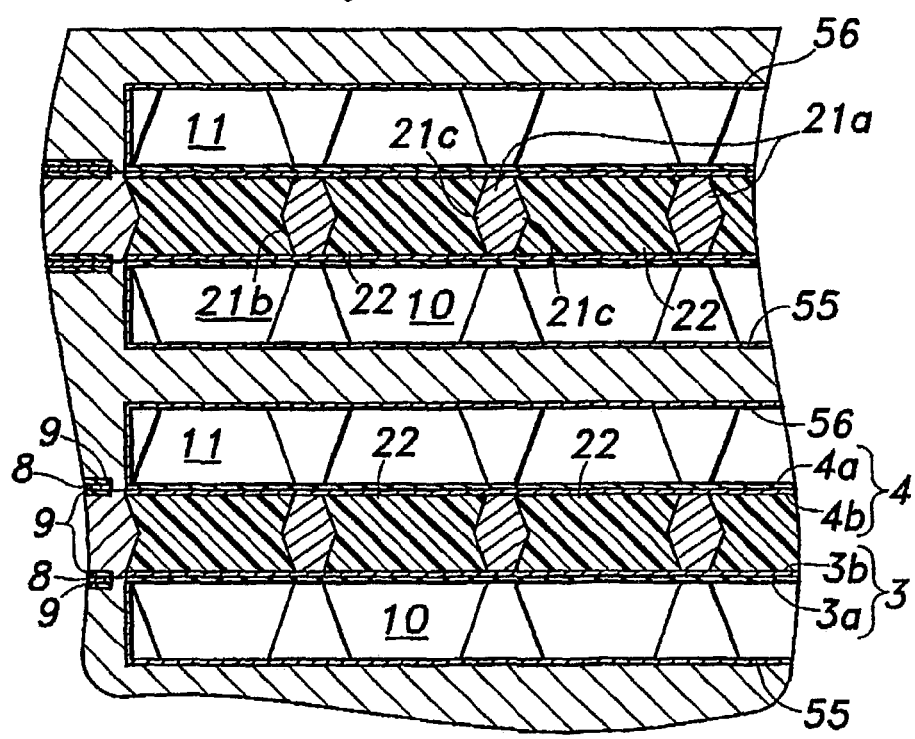
FIG. 2b is a sectional view taken along line IIb—IIb of FIG. 1.

Referring also to FIGS. 2a and 2b, each fuel cell 1 includes a central electrolyte layer 2, a pair of gas diffusion electrode layers 3 and 4 (see FIGS. 2a and 2b) placed on either side of the central electrolyte layer 2, and a pair of flow distribution plates 5 placed on either outer side of the gas diffusion electrode layers 3 and 4. The outer side of each flow distribution plate 5 is similarly formed as the inner side thereof so as to serve as the flow distribution plate for the adjacent fuel cell.

The electrolyte layer 2 includes a grid frame 21, and solid polymer electrolyte (SPE) 22 which is filled into rectangular through holes 21b defined between adjacent bars 21a of the grid frame 21. The SPE 22 may be made from such materials as perfluorocarbonsulfonic acid (Nafion: tradename), phenolsulfonic acid, polyethylenesulfonic acid, polytrifluorosulfonic acid, and so on.

The grid frame 21 is formed by etching or otherwise working a silicon wafer, and is provided with a rectangular and annular fringe portion and a rectangular grid area defined inside the annular fringe portion. Each bar 21a in the grid area of the grid frame 21 is provided with a projection 21c at an intermediate part thereof so as to project into an intermediate part of the corresponding through hole 21b as best shown in FIGS. 2a and 2b. The projection 21c is in the shape of a ridge extending along the length of the bar 21a, and produces a narrower middle part in each through hole 21b. The projection 21c helps to retain the SPE 22 in each through hole 21b.

Figure 3A:
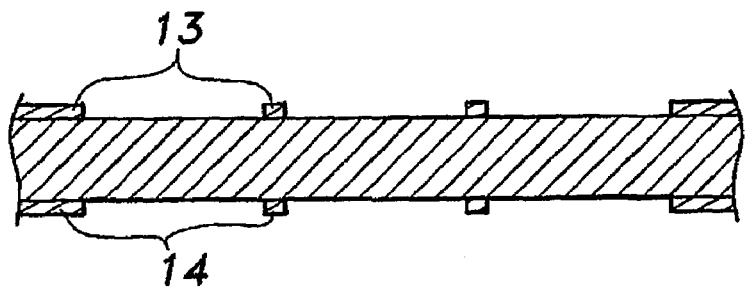
FIGS. 3a to 3c are sectional views of the electrolyte layer in different steps of the fabrication process.
Figure 3B:
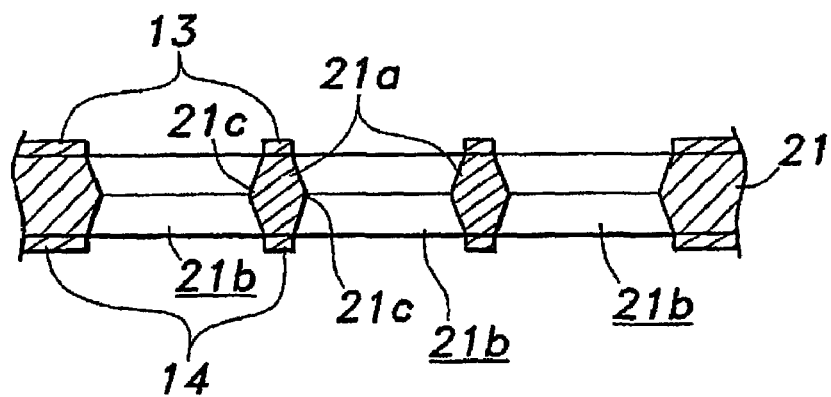
Figure 3C:
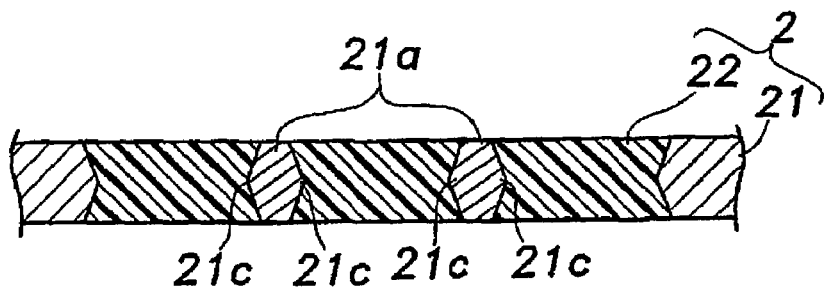

Such a projection can be conveniently formed at the same time as forming the grid frame 21. FIGS. 3a to 3c illustrate the process of forming the electrolyte layer 2. First of all, a suitably patterned etch mask 13 and 14, patterned by photolithography, is placed on each side of a silicon wafer serving as the material for the grid frame 21 as shown in FIG. 3a. An anisotropic etching is performed from both sides of the wafer as illustrated in FIG. 3b, and this produces a plurality of through holes 21b each of which is narrowed in a middle part by a projection 21c. Then, SPE 22 is filled into each of the through holes 21b so as to define a substantially flush planar surface on each side of the electrolyte layer 2.

In this embodiment, a rectangular through hole 23a, 23b, 24a and 24b is formed in each corner portion of the fringe portion of the grid frame 21. One of the diagonally opposing pairs of these through holes 23a and 23b serve as inlet and outlet for the fuel gas. The remaining opposing pair of these through holes 24a and 24b serve as inlet and outlet for the oxidizing gas. These holes are formed by anisotropic etching (wet etching), and are therefore formed as rectangular holes as was the case with the through holes 21b of the grid frame 21. They may also be formed by dry etching, and in this case, may have any desired shape.

Each flow distribution plate 5 is also formed by working a silicon wafer, and has a substantially conformal rectangular shape. A rectangular recess 51 or 52 having a flat bottom is formed centrally on each side of the flow distribution plate 5, and a plurality of projections 53 or 54 each having the shape of a truncated pyramid are formed on the flat bottom. The surface of the recesses and the projections are coated with a gold plate layer serving as an electrode terminal layer 55 or 56 by suitable means for electrically connecting the gas diffusion electrode layers 3 and 4 to an external circuit.

Figure 4A:
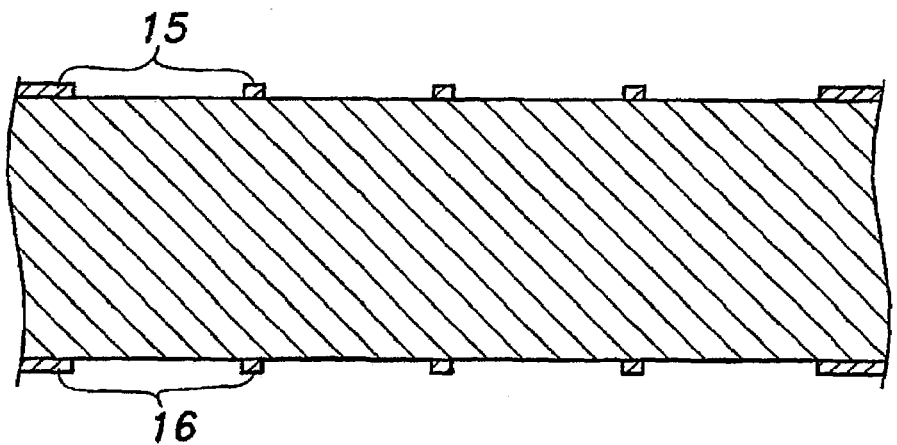
FIGS. 4a to 4c are sectional views of the flow distribution plate in different steps of the fabrication process.
Figure 4B:
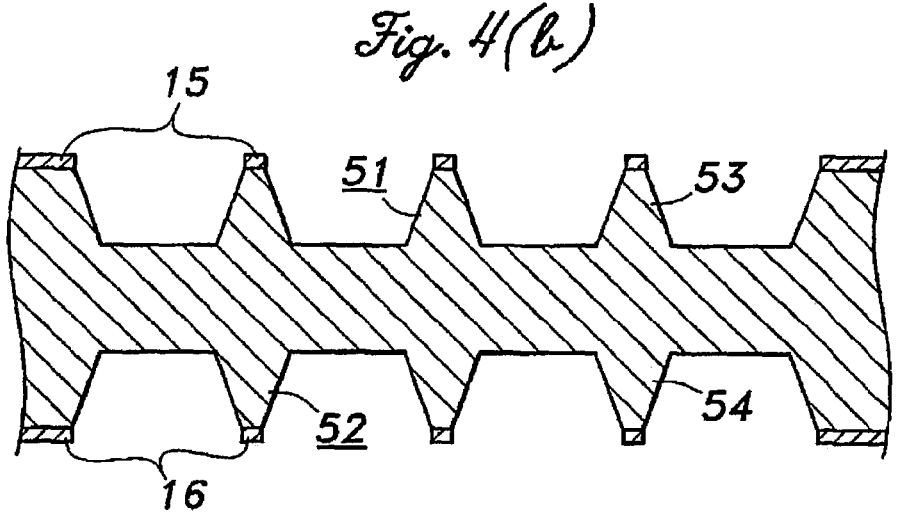
Figure 4C:
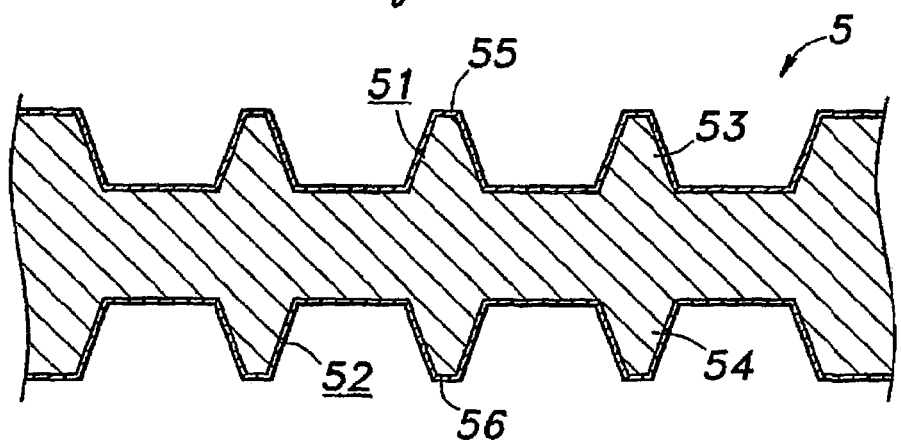

FIGS. 4a to 4c show the process of forming each flow distribution plate 5. A suitably patterned photoresist layer 15 and 16 is formed on each side of a silicon wafer as shown in FIG. 4a, and the silicon wafer is etched from both sides to form the recesses 51 and 52 and projections 53 and 54 at the same time as shown in FIG. 4b. The distribution plate 5 on the upper end or lower end of each fuel cell stack may be provided with a recess and projections only on inner side thereof. Thereafter, electrode terminal layer 55 and 56 is formed over the surface of the recesses 51 and 52 and projections 53 and 54 as shown in FIG. 4c.

The distribution plate 5 is conformal to the grid frame 21, and therefore has a rectangular shape. A rectangular through hole 57a, 57b, 58a or 58b is formed in each corner portion of the fringe portion thereof. One of the diagonally opposing pairs of these through holes 57a and 57b serve as inlet and outlet for the fuel gas. The remaining opposing pair of these through holes 58a and 58b serve as inlet and outlet for the oxidizing gas. As shown in FIG. 1, grooves 59a and 59b formed in the fringe portion communicate the recess 51 with the through holes 58a and 58b for the oxidizing gas, and similar grooves 60a and 60b communicate the recess 52 with the through holes 57a and 57b for the fuel gas. These grooves 58a, 58b, 59a and 59b are formed by anisotropic etching (wet etching), and are therefore each provided with a V-shaped cross section. The through hole 57a, 57b, 58a and 58b are also each provided with a rectangular shape as they are formed by anisotropic etching (wet etching), but may be given with any desired shape if they are formed by dry etching.

The gas diffusion electrode layers 3 and 4 each include a carbon sheet 3a or 4a having a layer of a platinum catalyst 3b and 4b mixed with SPE formed on the side thereof facing the electrolyte layer 2.

In this manner, in each fuel cell, a pair of flow distribution plates 5 are placed on either side of an electrolyte layer 2 via a gas diffusion electrode layer 3 or 4, and these components are joined by anodic bonding along the parts surrounding the recesses. Therefore, a plurality of narrow passages 11 are defined in one of the central recesses 52 of each electrolyte layer 2 for the fuel gas, and a plurality of similar narrow passages 10 are defined in the other of the central recesses 51 of the electrolyte layer 2 for the oxidizing gas. Each projection is substantially entirely covered by a gold plate layer serving as an electrode terminal, and lightly pushes the gas diffusion electrode layer 3 or 4 against the frame grid 21 of the electrolyte layer 2. Therefore, each gas diffusion electrode layer 3 or 4 is electrically connected to the corresponding distribution plate 5 via a large number of projections in a parallel relationship, and a reliable electric connection between the electrolyte layer 2 and an external circuit can be established.

The adhesion between the grid frame 21 and the distribution plates 5 can be accomplished in a number of different ways. Preferably, anodic bonding is used as described in the following. An electrode layer 9 and a layer 8 of heat resistance and hard glass, for instance, made of Pyrex glass (tradename) are formed along the peripheral surface of the grid frame 21 of the electrolyte layer 2 on each side thereof by sputtering, and a similar electrode layer 9 is formed along the peripheral part of the opposing surface of the distribution plates 5. Then, with this assembly heated to about 400° C. at which sodium ions become highly mobile, an electric field is produced in the assembly so as to move ions. In the fuel cell assembly of the present invention, if the electrolyte includes a solid polymer, heating the entire assembly to the temperature of 400° C. may damage the solid electrolyte. Therefore, according to this embodiment, a heater (not shown in the drawing) is placed under the electrode layer 9 to selectively heat only the peripheral part of the flow distribution plates. The heater could be a polycrystalline silicon sandwiched between insulating layers such as $Si_3N_4$ layers. If the electrode terminal layer 55 and 56 extend under the heater, the thermal efficiency of the heater will be impaired. Therefore, it is preferable to omit the electrode terminal layer 55 and 56 from under the heater.

The grid frame 21 and the distribution plates 5 are placed one over another, and compressed at a pressure of 100 $gf/cm^2$ to 2,000 $gf/cm^2$. Electric current is conducted through the polycrystalline silicon heater to locally heat the bonded area to a temperature in the other of 400° C. At the same time, a voltage in the order of 100 to 500 V is applied between the electrode layer 9 of the grid frame 21 and the electrode layer 9 of the distribution plate 5 for 10 to 30 minutes.

Alternatively, a bonding agent may be used for attaching the grid frame 21 and the distribution plates 5 together. In either case, it is possible to eliminate the need for any sealing arrangements or clamping arrangements to achieve a desired sealing capability, and this allows a compact design of the fuel cell assembly.

As the fuel gas and oxidizing gas (air) are conducted through this fuel cell 1, an electrochemical reaction takes places by virtue of the platinum catalyst, and an electric voltage develops between the electrode terminal layers 55 and 56. A number of such fuel cells are stacked so that a desired voltage can be obtained.

Although the fuel and oxidant for the fuel cells described herein consist of gases, the may also include liquids.

Although the present invention has been described in terms of preferred embodiments thereof, it is obvious to a person skilled in the art that various alterations and modifications are possible without departing from the scope of the present invention which is set forth in the appended claims.

The invention claimed is:

1. A fuel cell assembly comprising:
   (a) at least one cell including an electrolyte layer;
   (b) a pair of gas diffusion electrode layers interposing the electrolyte layer between them; and
   (c) a pair of flow distribution plates for defining passages for fuel and oxidizer gases that contact the gas diffusion electrode layers, characterized by that:
   the flow distribution plates are formed by performing an etching process on a substrate, wherein the electrolyte layer comprises a frame including a grid having a number of through holes, and electrolyte retained in each of the through holes.

2. The fuel cell assembly according to claim 1, wherein each of the flow distribution plates comprises a central recess and a number of projections formed in the recess, and each projection of the flow distribution plates engages the corresponding gas diffusion electrode layer so as to interpose the gas diffusion electrode layer between the projection and the grid.

3. The fuel cell assembly according to claim 2, wherein each projection of the flow distribution plates is provided with an electrode terminal for electrically connecting the corresponding gas diffusion electrode layer with an external circuit.

4. The fuel cell assembly according to claim 2, wherein each flow distribution plate is made of a silicon substrate, and the central recess and projections are formed by anisotropic etching so as to form each projection in a pyramidal shape.

5. A fuel cell assembly comprising:
   (a) at least one cell including an electrolyte layer;
   (b) a pair of gas diffusion electrode layers interposing the electrolyte layer between them; and
   (c) a pair of flow distribution plates for defining passages for fuel and oxidizer gases that contact the gas diffusion electrode layers, characterized by that:
   the gas diffusion electrode layers are formed by performing an etching process on a substrate, and wherein the electrolyte layer comprises a frame including a grid having a number of through holes, and electrolyte retained in each of the through holes, and the frame grid is also formed by performing an etching process on a substrate.

6. A fuel cell assembly comprising at least one cell including an electrolyte layer, a pair of gas diffusion electrode layers interposing the electrolyte layer between them, and a pair of flow distribution plates for defining passages for fuel and oxidizer gases that contact the gas diffusion electrode layers, characterized by that:
   the electrolyte layer comprises a frame including a grid having a number of through holes, and electrolyte retained in each of the through holes.

7. The fuel cell assembly according to claim 6, wherein the grid of the frame is provided with a projection which projects into the corresponding through hole.

8. The fuel cell assembly according to claim 7, wherein the frame is made of silicon substrate, and the through holes and projections are formed by conducting anisotropic etching from two sides of the silicon substrate so as to produce a narrowed middle part in each through hole.

9. The fuel cell assembly according to claim 6, wherein each of the flow distribution plates comprises a central recess and a number of projections formed in the recess, and each projection of the flow distribution plates engages the corresponding gas diffusion electrode layer so as to interpose the gas diffusion electrode layer between the projection and the grid.

10. The fuel cell assembly according to claim 9, wherein each projection of the flow distribution plates is provided with an electrode terminal for electrically connecting the corresponding gas diffusion electrode layer with an external circuit.

11. The fuel cell assembly according to claim 9, wherein each flow distribution plate is made of silicon substrate, and the central recess and projections are formed by anisotropic etching so as to form each projection in a pyramidal shape.

* * * * *